PORTABLE, ONE-HAND-OPERABLE LABELING MACHINE

Original Filed June 19, 1968 16 Sheets-Sheet 1

PORTABLE, ONE-HAND-OPERABLE LABELING MACHINE

Original Filed June 19, 1968 16 Sheets-Sheet 2

PORTABLE, ONE-HAND-OPERABLE LABELING MACHINE

Original Filed June 19, 1968 16 Sheets-Sheet 3

PORTABLE, ONE-HAND-OPERABLE LABELING MACHINE

Original Filed June 19, 1968 16 Sheets-Sheet 4

PORTABLE, ONE-HAND-OPERABLE LABELING MACHINE

Original Filed June 19, 1968 16 Sheets-Sheet 5

PORTABLE, ONE-HAND-OPERABLE LABELING MACHINE

Original Filed June 19, 1968 16 Sheets-Sheet 6

PORTABLE, ONE-HAND-OPERABLE LABELING MACHINE

Original Filed June 19, 1968 16 Sheets-Sheet 8

PORTABLE, ONE-HAND-OPERABLE LABELING MACHINE

Original Filed June 19, 1968 16 Sheets-Sheet 9

PORTABLE, ONE-HAND-OPERABLE LABELING MACHINE

Original Filed June 19, 1968 16 Sheets-Sheet 10

PORTABLE, ONE-HAND-OPERABLE LABELING MACHINE

Original Filed June 19, 1968 16 Sheets-Sheet 11

PORTABLE, ONE-HAND-OPERABLE LABELING MACHINE

Original Filed June 19, 1968 16 Sheets-Sheet 12

PORTABLE, ONE-HAND-OPERABLE LABELING MACHINE

Original Filed June 19, 1968 16 Sheets-Sheet 14

PORTABLE, ONE-HAND-OPERABLE LABELING MACHINE

Original Filed June 19, 1968 16 Sheets-Sheet 15

PORTABLE, ONE-HAND-OPERABLE LABELING MACHINE

Original Filed June 19, 1968 16 Sheets-Sheet 16

United States Patent Office

Re. 27,889
Reissued Jan. 15, 1974

27,889
PORTABLE, ONE-HAND-OPERABLE LABELING MACHINE

Yo Sato, Tokyo, Kiyoji Nagashima, Ageo, Yoshio Murata, Omiya, Kazunosuke Makino, Ageo, Eiichi Matsushima, Omiya, and Sozo Izumihara, Kawaguchi, Japan, assignors to Sato Kiko Kabushiki Kaisha, Tokyo, Japan Original No. 3,551,251, dated Dec. 29, 1970, Ser. No. 738,176, June 19, 1968. Application for reissue July 17, 1972, Ser. No. 272,136
Claims priority, application Japan, June 26, 1967, 42/40,906; Aug. 17, 1967, 42/52,452; Sept. 16, 1967, 42/59,244; Sept. 22, 1967, 42/80,476; Nov. 11, 1967, 42/72,485; Feb. 20, 1968, 43/10,474
Int. Cl. B32b *31/00;* B44c *7/00*
U.S. Cl. 156—384 6 Claims

Matter enclosed in heavy brackets [ ] appears in the original patent but forms no part of this reissue specification; matter printed in italics indicates the additions made by reissue.

ABSTRACT OF THE DISCLOSURE

An improved portable, one-hand operable labeling machine comprising a machine frame having a palm-grip handle integrally joined thereto, a grip lever operated by manual squeezing thereof, a roll holder holding rotatably a roll of label tape coated on one surface thereof with an adhesive material and having partial cuts aligned in the tape transverse direction and spaced at equal intervals in the tape longitudinal direction, a tape advancing means driven by movements of said grip lever to engage successively said cuts to advance said label tape step by step toward a dispensing opening of the machine frame, a tape cutting device driven by movement of said grip lever to cut successively the label tape at said cuts, a printing device driven by movement of said grip lever to imprint inscriptions on each of said cut pieces of the label tape, and a tape applying device disposing in the vicinity of the dispensing opening of the machine and operating to press each label piece onto an article to cause said adhesive material to stick the cut piece to the article. The tape advancing means has at least one pawl tooth for engaging at least one of the cuts of the label tape, said pawl tooth undergoing an intermittent reciprocating motion resulting from one cycle of the squeezing and releasing the grip lever. The tape advancing means may be a tape advancing roller provided around its cylindrical surface with projecting pawl teeth spaced at constant circumferential intervals equal to the spacing intervals of the cuts of the label tape, and may be a conveyer type mechanism. Disclosed also are various kinds of the cutting mechanism adapted to carry out improved and effective cutting of the cuts of the label tape. The adhesive material may be provided with a moisture applying device for applying moisture thereto.

BACKGROUND OF THE INVENTION

This invention relates generally to a portable, one-hand-operable labeling machine, and more particularly to said machine capable of effectively applying cut pieces to articles in a successively continuous manner.

Hitherto, the conventional hand-operable labeling machines are very complicated, inconvenient and liable to be impaired.

The nature, principle, details, and utility of the invention will become more clearly apparent from the following detailed description with respect to preferred embodiments of the invention, when read in conjunction with the accompanying drawings, in which like parts are designated by like reference numerals.

Figure 1:
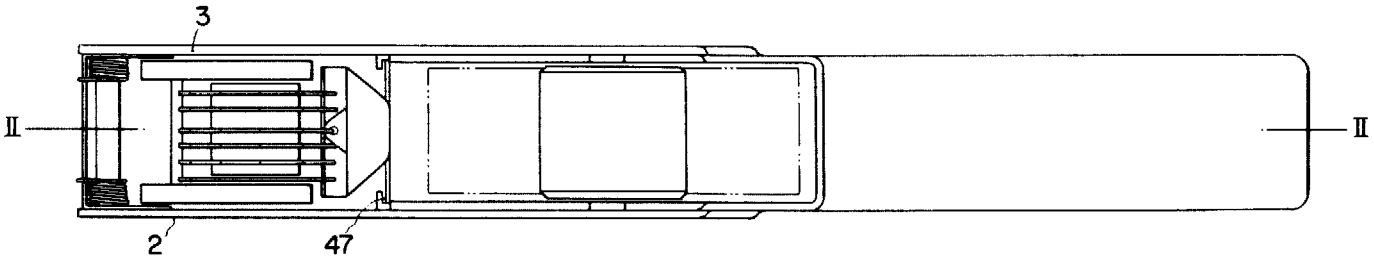
FIG. 1 is a plan view of the entire assembly of one example of the labeler according to the invention.
Figure 2:
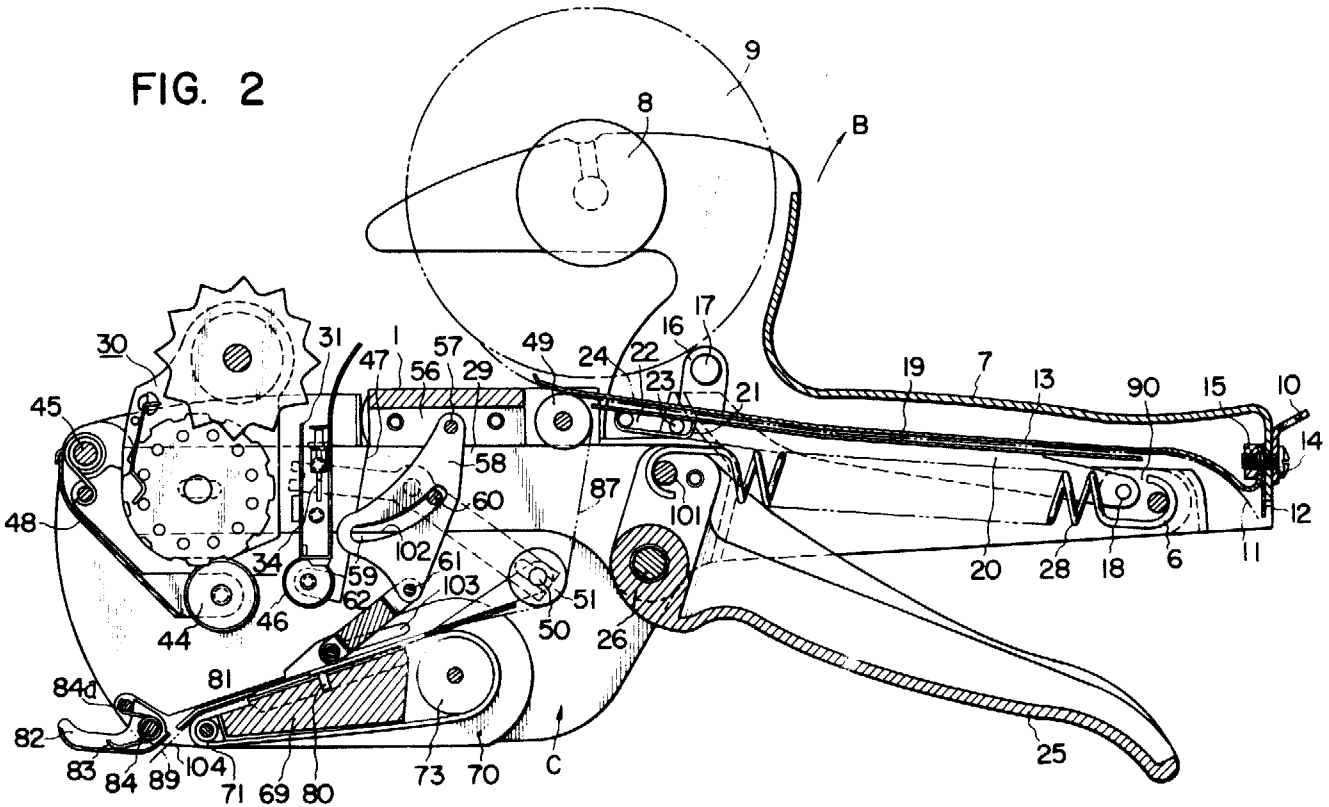
FIG. 2 is a longitudinal section taken along the plane indicated by line II—II in FIG. 1 as viewed from the left side and shows the labeler in the normal state of rest.
Figure 15:
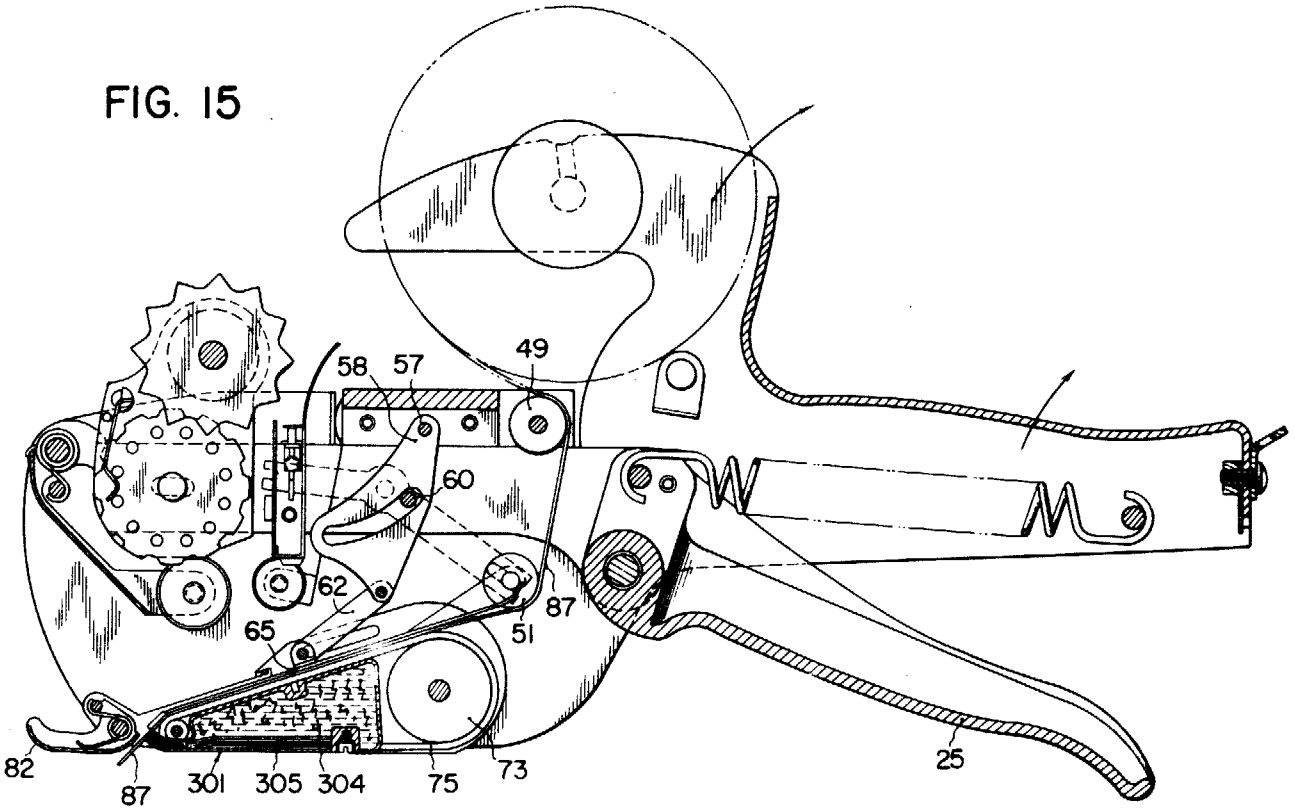
FIG. 15 is a left side elevational view, partly in section, showing the essential organization of anther example of a labeler embodying the invention.
Figure 16:
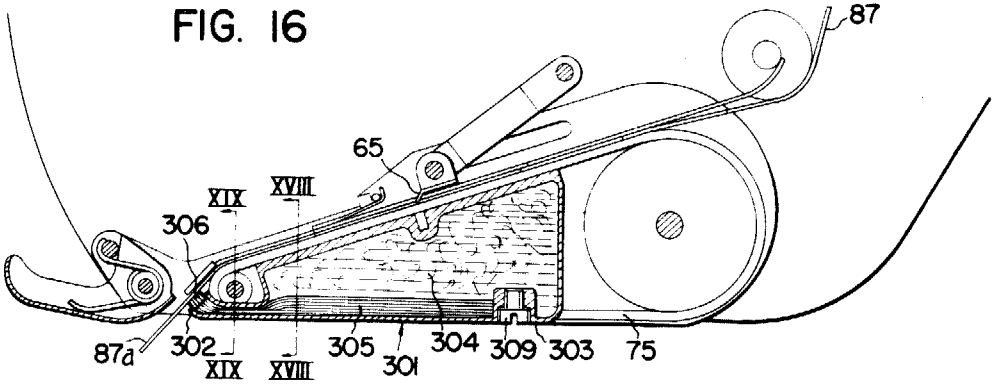
FIG. 16 is an enlarged, fragmentary, left side elevational view, partly in section, showing a label moistening mechanism of the labeler shown in FIG. 15.
Figure 17:
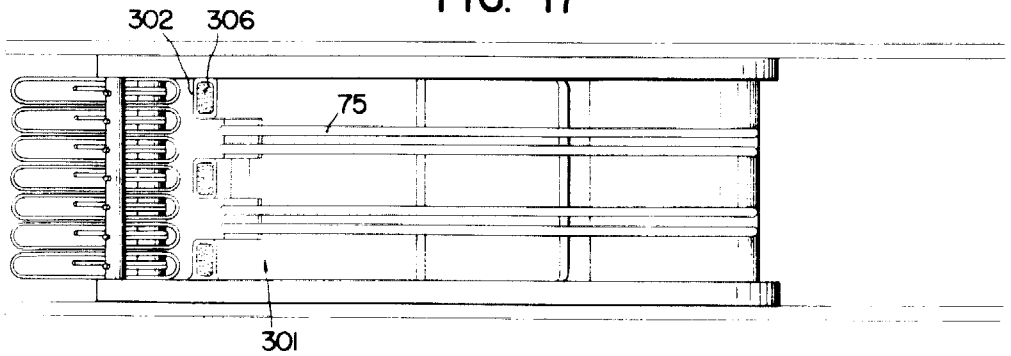
FIG. 17 is a plan view showing the essential parts of the mechanism shown in FIG. 16.
Figure 22:
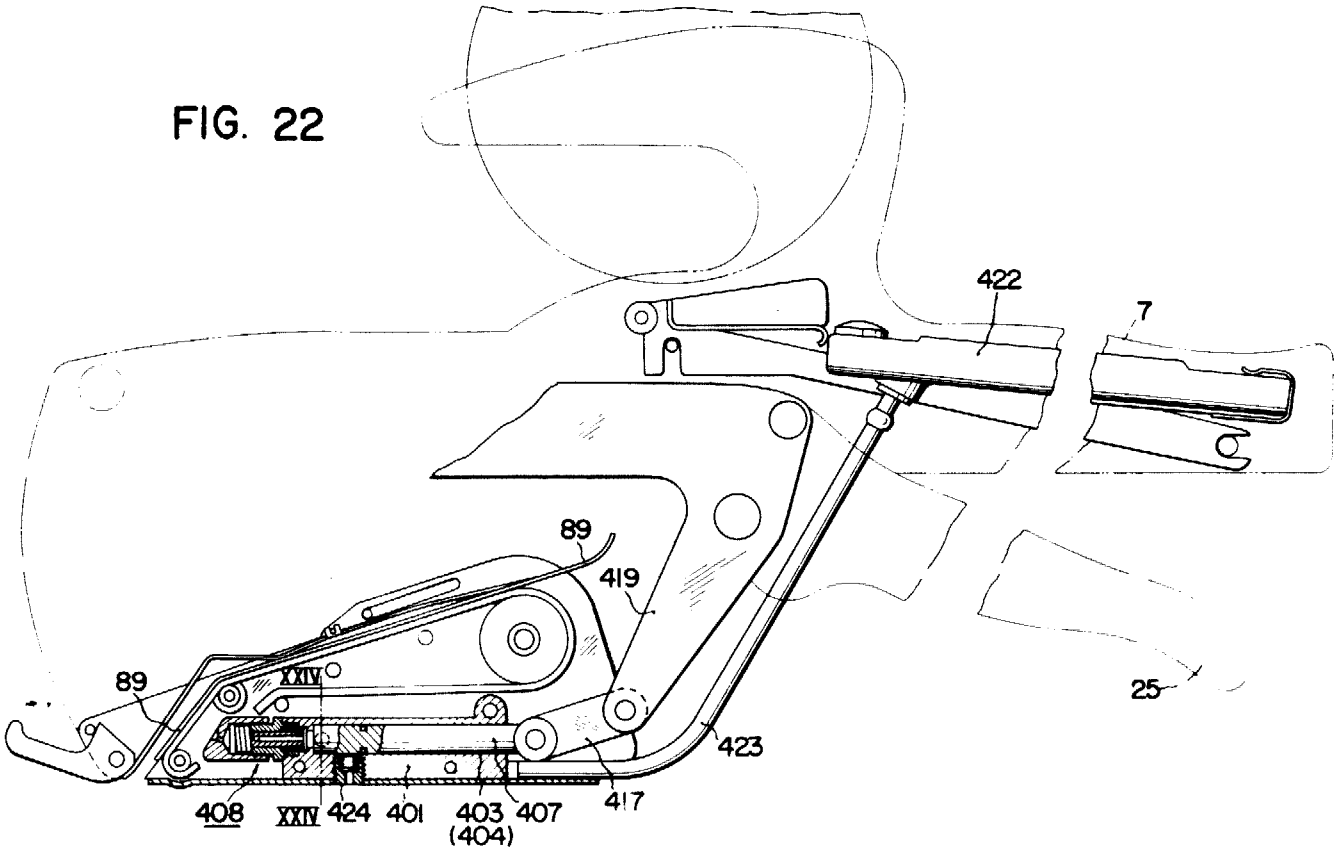
FIG. 22 is a left side elevational view, with parts cut away and certain parts omitted, showing a modification of the labeler illustrated in FIG. 15.
Figure 23:
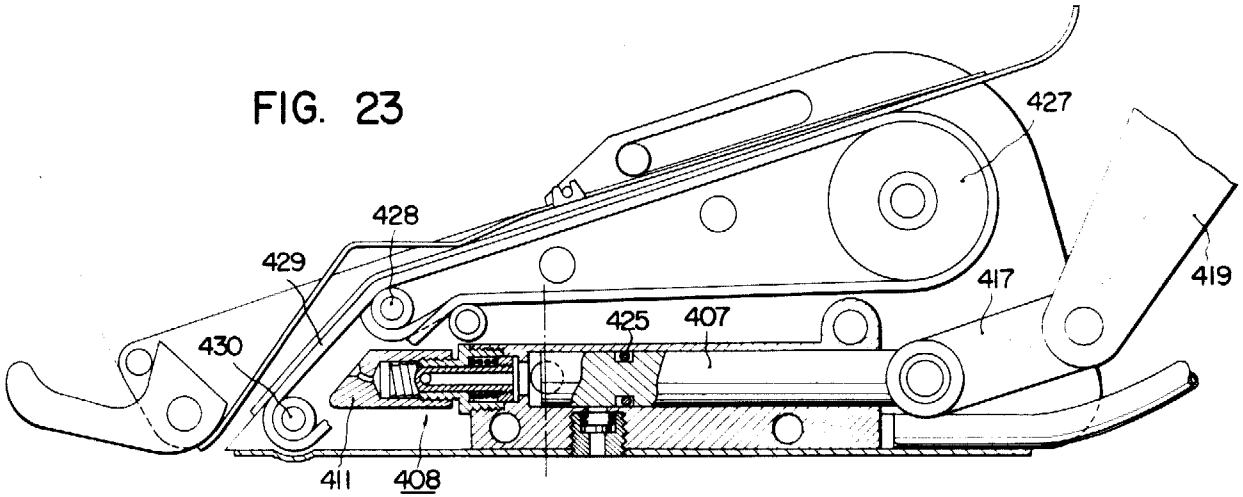
FIG. 23 is an enlarged, fragmentary, left side elevational view showing an essential part of the labeler shown in FIG. 22.
Figure 26:
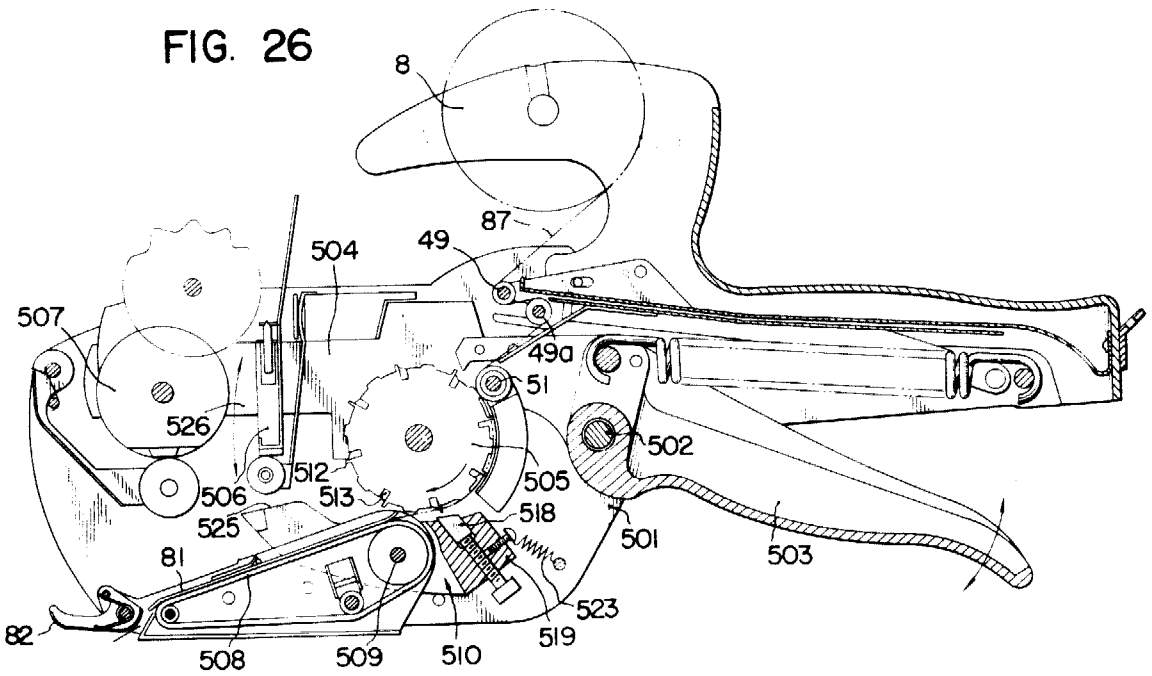
FIG. 26 is a left side elevational view, partly in vertical section, showing still another example of a labeler embodying the invention.

For consistency in designating directions, the directions toward the left and the right as viewed in FIGS. 1 and 2 are herein referred to as "front" (or "forward") and "rear", and the directions toward the top and bottom as viewed in FIG. 1 are referred to as "right" and "left." "Upper" and "lower" and like terms relate to the upper and lower directions as viewed in elevational views such as FIGS. 1, 15 and 26. All rotational directions are those as viewed from the left toward the right.

Referring first to FIGS. 1 through 10 illustrating one example of an embodiment to the present invention, the labeler shown therein has a frame structure constituting a partial casing and comprising side plates 2 and 3, a connector plate 1 bridging across and connecting side plates 2 and 3 at their upper edges, a handle 7 serving as a rear cover and having a label roll support or holder 8, and a bottom plate, these elements of the frame structure being fastened principally by screws.

The side plates 2 and 3 have relatively narrow extensions 4 directed rearward. The handle 7 near its rear end is pivotally connected by a screw-fastened horizontal pin 6 to the rear ends of the extensions 4, and its holder 8 rotatably holds a reel 9 of a continuous tape of a material for labels. As described more fully hereinafter, this tape consists of an adhesive bearing tape for labels in laminar combination with a protective tape 11.

A ring 10 for hanging the labeler, a cutter 12 for the protective tape 11, and the rear end of an upper guide plate 13 for the protective tape are fastened by screws 14 and nuts 15 to the rear end of the handle 7. The upper guide plate 13 extends forward to a point below and close to the periphery of a full reel 9 in amounted position and is fixed at a suitable part by screws 17 to the holder 8.

The handle 7 has a hollow construction substantially in the form of a channel with downwardly directed flanges and an upper web forming the palm grip of the handle. The flanges of the handle 7 at its pivoted part have forwardly projecting parts 90 on which the rear ends of downwardly directed flanges 20 of a lower guide plate 19 for protective tape are pivoted by transverse pins 18, which are disposed slightly forward of and parallel to the aforementioned pivot pin 6. Parts of the flanges 20, near their front ends, are provided with guide slot structures 21 through which is passed a transverse pin 23 fixed to side plates 2 and 3.

The front extremity of the lower guide plate 19 is normally disposed in the close proximity of a guide roller 49 when the handle 7 is in closed state against the extensions 4 of the side plates 2 and 3, at which time the upper and lower guide plates 13 and 19 for the protective tape are spaced apart by a gap 24 between their mutually facing surfaces through which the protective tape 11 can easily pass in guided movement toward the rear part of the handle 7.

A hand grip lever 25 is pivoted at approximately its middle part by a transverse shaft pin 26 at the rear parts of the side plates 2 and 3 near the root parts of the extensions 4. A tension spring 28 is stretched between the pin 6 at the rear part of the handle 7 and a transverse pin fixed to the grip lever 25 at a short distance above the shaft pin 26 and imparts a torque on the lever 25 urging it to rotate clockwise, whereby the rear hand grip arm thereof is urged away from the handle 7.

The front arm of this lever 25 is in the form of a yoke 29, formed by vertical left and right plates, which supports a first printing device 34 for imprinting inscriptions such as the name of a product and the name of a shop on labels, a second printing device 30 for imprinting marks such as prices, a label cutter knife 31, a transverse guide pin 60, and other parts.

The guide pin 60 is within an arcuate guide slot 102 in a guide plate 58, the upper end of which is pivoted by a pin 57 on the connector plate 1 or side plates 2 and 3. The lower part of the guide plate 58 is pin jointed by a pin jointed by a pin 51 to link member 62 of a label advancing device.

Figure 6:
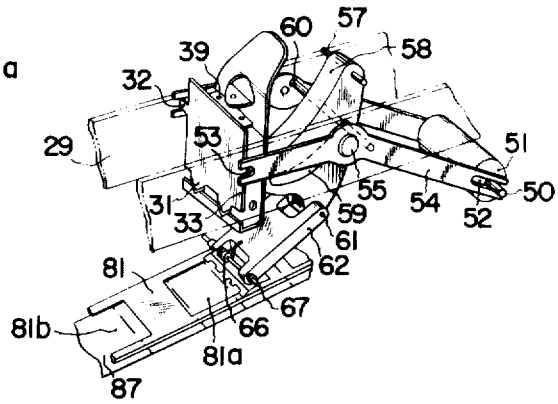
FIG. 6 is a fragmentary perspective view showing the essential organization of the printing mechanism, label cutting mechanism, and the label advancing mechanism in coupled state.
Figure 8:
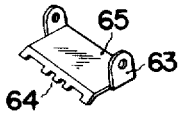
FIG. 8 is a perspective view of a label advancing pawl.

In the label advancing device, as shown in FIG. 6, an advancing pawl 65 is pivoted at its rear part by a transverse pin 67 on the lower front end of the link member 62, and the free end of this pawl 65 is urged downward by a spring 66. Pawl teeth 64 sloping forwardly are formed on the front leading edge of the pawl 65 as shown in FIG. 8 and enter into a label guide plate 81 connected at its rear end to a shaft 50. The both ends of the above mentioned pin 67 are fitted in an engaged with inclined guide glots 103 formed in side plates 70 and 70a.

Figure 9:
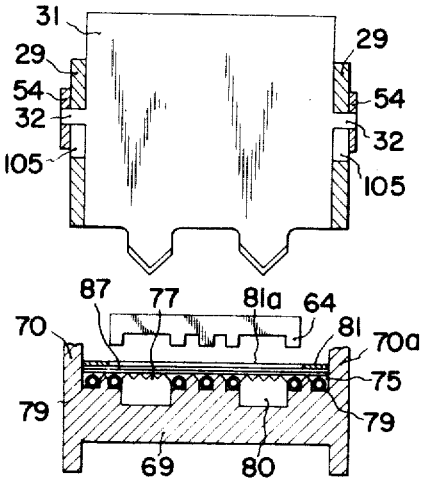
FIG. 9 is a front elevational view, in vertical section of the label cutting mechanism and the label advancing mechanism shown in FIG. 6.

The yoke 29 of the grip lever 25 further supports rocker levers 54 pivoted thereon by pins 55 as shown in FIG. 6. These levers 54 are provided at their rear ends with cutout slots 52 in which is fitted the shaft 50 of a roller 51 for changing the direction of travel of the label tape. The front ends of the levers 54 are also provided with cutout slots 53 in which are fitted side lugs 32 of a label cutter knife 31. These side lugs 32 are fitted also in vertical slots 105 formed in the side walls of the yoke 29, as shown in FIG. 9, whereby the knife 31 can move in the vertical direction.

Figure 7:
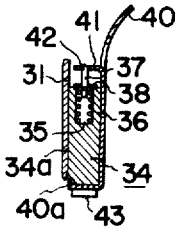
FIG. 7 is a left side elevational view, in vertical section, of the printing mechanism.

The label cutter knife 31 is free to move thus in contact with the printing device 34 as indicated in FIG. 7 but independently of the printing device 34. This printing device 34 has a support member 34a provided in its upper part with a vertical hole 35 in which a pin 37 with a needle-like tip is urged upward by a spring 36 and stopped at a certain position by plate 38.

The support member 34a is partly enclosed by a type holder 40 having a bent lug 41 provided with a through hole 42 with which the tip of the pin 37 is engaged. The type holder 40 at its lower end supports a rubber type plate 43 bonded thereto by an adhesive.

Below the aforementioned label guide plate 81, a label tape receiving base 69 is fastened by screws to the side plates 2 and 3 of the frame structure. As indicated in FIG. 9, this label tape receiving base 69 is provided with longitudinal saw-tooth ridges 77 of knife-edge form on its upper face, with grooves 80 in positions confronting and aligned with two knife edges of the knife 31, and with belt grooves 79 for receiving spring belts 75. The depth of the belt grooves 79 is such that the upper surfaces of the spring belts 75 fitted, therein lie in substantially the same plane as the crests of the saw-tooth ridges 77. A gap is provided between this surface and the aforementioned label guide plate 81 for passage of the label tape therethrough.

The spring belts 75 are disposed in an endless form around grooved rollers 73 and 71 of different size rotatably supported at the ends of the label tape receiving base 69.

Figure 5:
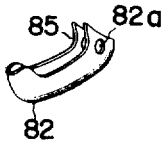
FIG. 5 is a perspective view of a presser for applying and pressing down a label.

A plurality of label pressing fingers 82 are pivotably supported in side-by-side arrangement on the lower front parts of the side plates 2 and 3 of the frame and project forward from the frame structure. Each finger, which has a configuration as shown in FIG. 5, has one or two holes 82a in its upward projecting rear part, through which a common transverse pin 84 is passed. The diameter of holes 82a is made considerably larger than the diameter of the pin 84 so that each finger 82 can move also vertically relatively to the pin 84.

A spring 83 for each finger 82 is provided around the pin 84, one end of the spring pressing against the bottom of the corresponding finger and the other end being anchored on a pin 84a secured to the side plates 2 and 3. Each finger 82 is thereby urged downward by spring force. The plurality of label pressing fingers 82 pivotally supported on pin 84 and urged by individual springs 83 thus form, as a whole, a press-down device for labels dispensed from the labeler.

The aforementioned label guide plate 81 has a front end which is bent slightly downward and terminates at a front edge which is close to the rear ends of the fingers 82. Below the front end of the guide plate 81, there is disposed a forwardly inclined guide piece 104 for contacting and guiding the lower surfaces of labels being dispensed.

Figure 3:
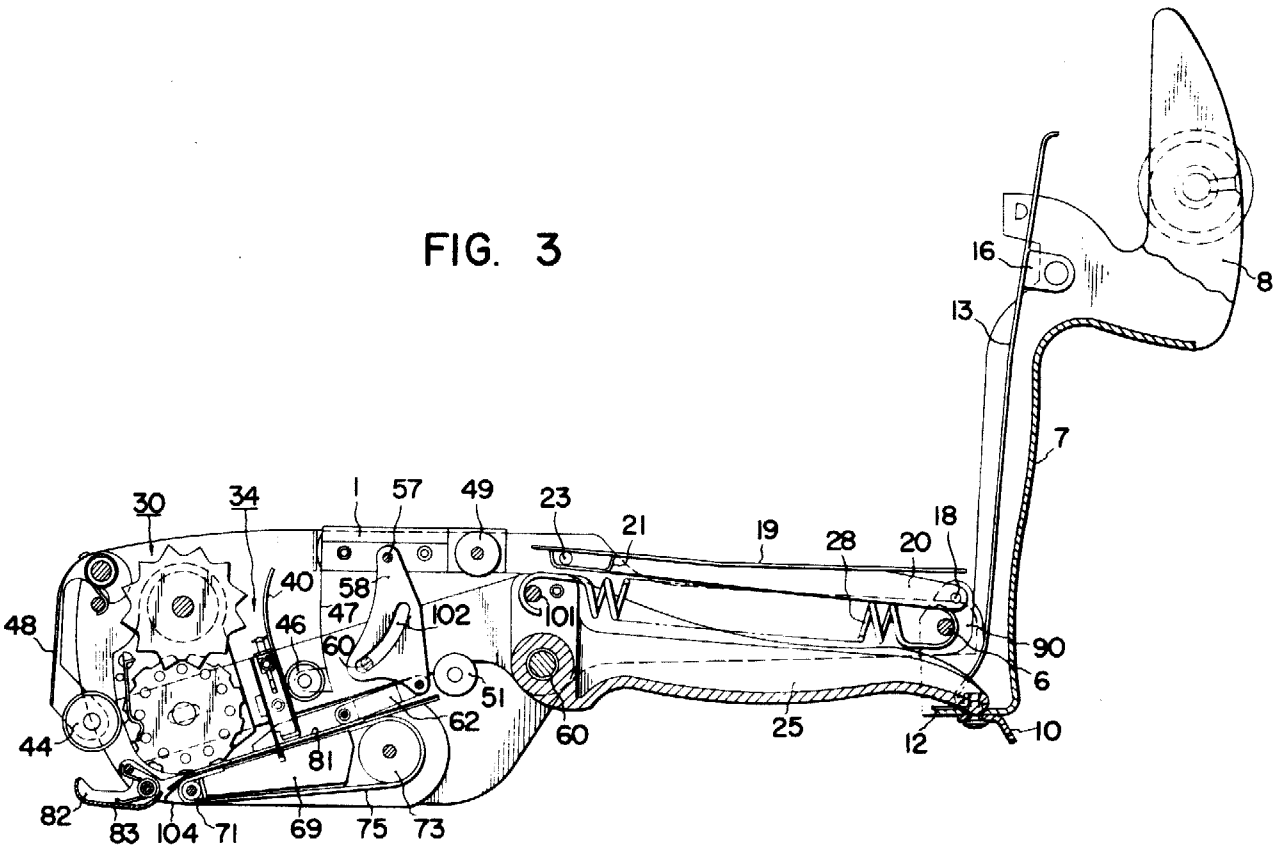
FIG. 3 is also a section along a line II—II but shows the state wherein the hand lever is in a fully gripped position, and the label roll holder is in an opened position.
Figure 4:
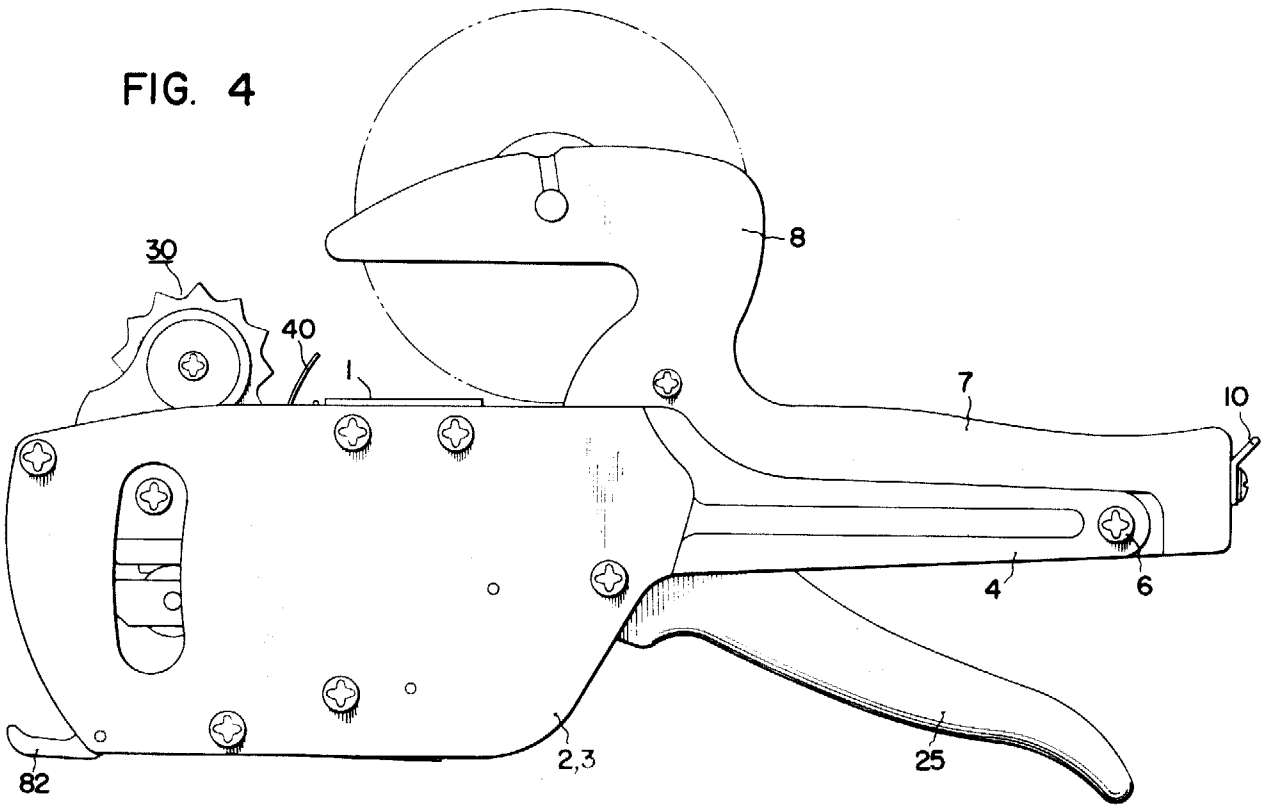
FIG. 4 is a left side elevational view showing the exterior appearance of the labeler.

As shown in FIGS. 2 and 3, the aforementioned first and second printing devices 34 and 30 are provided respectively with ink rollers 46 and 44 made essentially of felt impregnated with ink and rotatably supported on roller holders 47 and 48 which are backed by spring force.

Figure 10:
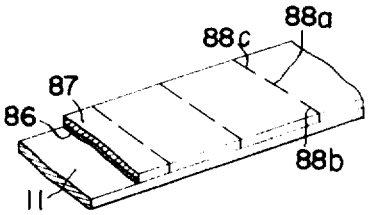
FIG. 10 is a fragmentary perspective view showing a fragment of a continuous label structure suitable for use in the labeler of the invention.

FIG. 10 illustrates a fragment of a laminated tape consisting of a laminar combination of a protective tape 11 and a label tape 87 bearing an adhesive 86 on its surface facing the protective tape.

The label tape 87 is provided at regular intervals in its longitudinal direction with groups of transversely aligned partial cuts, each group consisting of a center cut 88a and side cuts 88b and 88c. These groups of cuts divide the label tape into divisions each forming a single label. The center cuts 88a are provided so as to afford parts of the label tape 87 where the advancing pawl 65 can catch in a positive manner, while the side cuts 88b and 88c. are provided principally for facilitating the cutting of the label tape by the label cutter.

The example labeler of the above described essential organization according to the present invention operates in the following manner.

(1) Tape loading

Handle 7 combined with tape holder 8 is manually swung open in the arrow direction B in FIG. 2 around pin 6 relative to the remainder of the labeler. A reel 9 of continuous tape is loaded into holder 8. At the free end of the reeled taped, label tape 87 is peeled away from protective tape 11. The separated protective tape 11 is held against the lower surface of upper guide plate 13, while the label tape thus separated is inserted into the gap between lower guide plate 19 and guide roller 49.

Although this gap is narrow when handle 7 is normally closed, it opens to facilitate insertion of the label tape when handle 7 is opened since the projecting part 90 at the rear part of handle 7 rotates together therewith, and a lower guide plate 19, which is pivotally connected at its rear end to this part 90, is thereby pulled rearward, whereby the front edge thereof retracts away from roller 49.

One or more fingers are inserted through the aperture (part C) between the lower rear part of side plates 2 and 3 to pull the free ends of the label tape and pass the same around direction changing roller 51. The end of label tape 87 is further inserted into the gap between label guide plate 81 and large roll 73 to a position at which one group of partial cuts 88b, 88a, and 88c in label tape 87 is directly below pawl teeth 64.

The separated protective tape 11 is passed rearward through the space between upper guide plate 13 and lower guide plate 19 and is drawn out through the rear end of handle 7.

Handle 7 and reel holder 8 are closed (lowered) and fastened in the normal locked position to side plates 2 and 3 by suitable locking means (not shown).

(2) Label advancing and dispensing

When hand gip lever 25 is squeezed and closed toward handle 7, yoke 29 descends, rotating about shaft 26. Consequently, pin 60 inserted through slot 102 in the guide plate 58 permits this guide plate 58 to rotate counterclockwisely about pin 57. That is, the lower part of guide plate 58 moves rearward. As a result, a link member 62 is pulled rearward, and a pawl 65 at the front end thereof is retracted rearward.

When the grip lever 25 is released, the above described action is reversed, and an advancing pawl 65 advances, whereupon the pawl teeth 64 enter one of the partial cuts 88 in label tape 87 and bite into spring belts 75 to cause the label tape and spring belts to advance. (When retracting, pawl teeth 64 merely slide over the label tape 87 because of their rearward inclination.) Consequently, the extreme front end of the label tape inserted between a large roll 73 and a guide plate 81 is caused to advance, riding on spring belts 75.

Thus, the pawl teeth 64 slide over the label tape 87 during retraction and, when the reach a cut 88a during advance, they pass through this cut to bite into the spring belts therebelow, causing the belts to advance toget her with the label tape. When, after an advance through a predetermined stroke, the pawl teeth are retracted, they stop at a position which is slightly to the rear of the following group of cuts 88a, 88b, and 88c since the retraction stroke is made slightly longer than the length of a single label. Therefore, during the succeeding forward stroke of pawl 65, the label tape is always advanced by the distance between the groups of cuts therein, that is, the length of one label.

Since the reverse side (lower surface) of label tape 87 passes over ridges 77 of the knife-edge form, there is no possibility of the adhesive on the reverse side of the label tape sticking to the label receiving base 69 or being damaged by abrasion.

The protective tape, which has been separated in a semi-compulsory manner form the label tape by a guide roller 49 and the front end of lower guide plate 19 close thereto and passed rearward between upper and lower guide plates 13 and 19 to the outside, is cut off suitably by the cutter 12.

(3) Printing

The descending movement of yoke 29 causes a printing device 34 dismountably mounted thereon to descend as is pushes the ink roller 46 rearward, overcoming the counter force of a leaf spring 47. As a result, rubber type 43 at the lower end of type holder 40 imprints an inscription on the upper surface of a label through cutout 81a (FIG. 6) in the label guide plate 81. Similarly, the printing device 30 at the front end of yoke 29 also descends as it pushes past an ink roller 44 and imprints another inscription on a label through cutout 81b in a guide plate 81.

While it is possible to imprint the two inscriptions simultaneously on a single label, it is preferable to imprint them separately since simultaneous printing by two printing devices is difficult because of the short length of each label and lack of space for two printing devices to operate without mutual interference. That is, the first printing device 34 is adapted to print on the front half of each label through cutout 81a of label guide plate 81, while the second printing device 39 is adapted to print on the rear half of another label is one or two labels ahead through the other cutout 81b.

The first printing device 34 may be adapted to print names such as those of shops and products, while the second printing device 30 may be adapted to print the information such as prices. In this case, it is not necessary to change the second printing device whenever the information (e.g., price) changes since this information can be changed merely by rotating the numerical digits of the device.

However, a printing type plate 43 of the first printing device must be changed to change the information there (e.g., name of a shop or product). For this purpose, type holder 40 is pushed downward against the force of spring 36, as shown in FIG. 7, and removed from the lower end of support member 34a. Thus, only the type holder 40 is taken out, and the type plate 43 bonded to its lower end is changed. The type holder 40 is then reinstalled in a simple manner by depressing the tip of pin 37 against the force of spring 36, fitting the lower end of type holder 40 against the lower end of support member 34a, and releasing the top of pin 37.

(4) Label tape cutting

When the yoke 29 descends, a knife 31 also descends together with the first printing device 34 (FIG. 6), but since rocker levers 54 are also pivotally connected by pins 55 to the yoke 29, they rotate in the counterclockwise direction about the pin 50 supported by side plates 2 and 3. Consequently, as the yoke 29 descends, the knife 31 descends further than the printing device 34 by an additional displacement due to the this rotation of rocker levers 54, and the two knife edges project downward beyond the lower end of the type plate 43.

Then, as the yoke 29 and the accompanying parts descend further, knife edges enter groove 80 of the label receiving base 69 to cut the uncut connective parts of label taps 87 along the line of one group of partial cuts 88a, 88b, and 88c.

The position of descending knife edges relative to the label tape 87 is so set as to coincide with the position at which a group of partial cuts in the tape 87 stops after being advanced by the pawl teeth 64.

When the yoke 29 ascends, the knife 31 is caused by the action of rocker levers 54 to rise higher than the lower end of the first printing device 34. The purpose of causing the knife to retract further than the lower end of the printing device in this manner at times other than that of label tape cutting is to prevent the knife edges of knife 31 from damaging the felt of printing ink roller 46 when the printing device descends.

(5) Label application

In the manner described above, the label tape is advanced on spring belts 75 of label receiving base 69, and each label is printed and then cut from the following label tape. The label thus cut is then bent downward at the bent end part of label guide plate 81 and guided to a guide member 104 and reaches a position below the label pressing fingers 82.

When this label is pressed against the surface of an article, it is caused by the adhesive thereon to adhere to the article. Since pressing fingers 82 comprise a plurality of individual fingers freely fitted on a common pin 84 and provided with respective springs, they assume displacements conforming to the surface configuration of any article against which they are pressed to press the label interposed therebetween into intimate adhesion with the article.

For example, when the label is to be stuck on an article with a surface which projects outward at the middle part of the label, the fingers 82 at the middle part are forced to retract in a floating manner counter to the forces of springs 83 (because pivot holes 82a of the pressing fingers are larger than the diameter of pin 84), all fingers 82 thereby pressing the label in a substantially uniform manner and causing it to adhere intimately to the surface in conformance with its counter.

When necessary, further pressure can be applied on the label thus applied by tilting the entire labeler in the counterclockwise direction to deflect fingers 82 further.

In a second example of an embodiment of the invention as illustrated in FIGS. 11 through 14, endless flat belts are use, instead of the spring belts 75 in the preceding first example. These flat belts are provided on their outer surfaces with several longitudinal ridges whereby to reduce the contact surface thereof with respect to the label tape and, moreover, are coated with an agent such as silicone oil to nullify or reduce the tackiness of the adhesive on the label tape with respect to the flat belts thereby to facilitate the separation of the label tape from the belts at the forward end thereof. Furthermore, the rollers around which these belts are stretched are supported in an elastic manner whereby the belts are placed constantly in a state of suitable tension.

Figure 11:
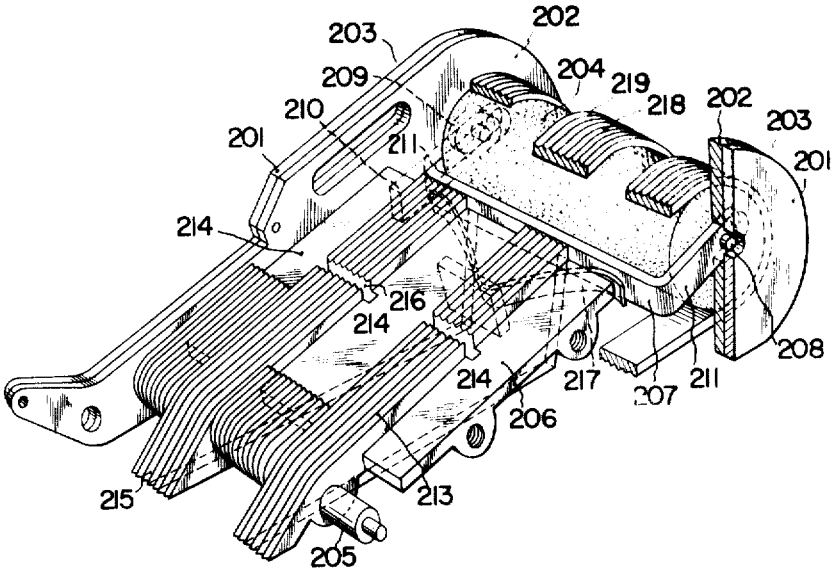
FIG. 11 is a perspective view of another example of the label advancing mechanism according to the invention.
Figure 12:
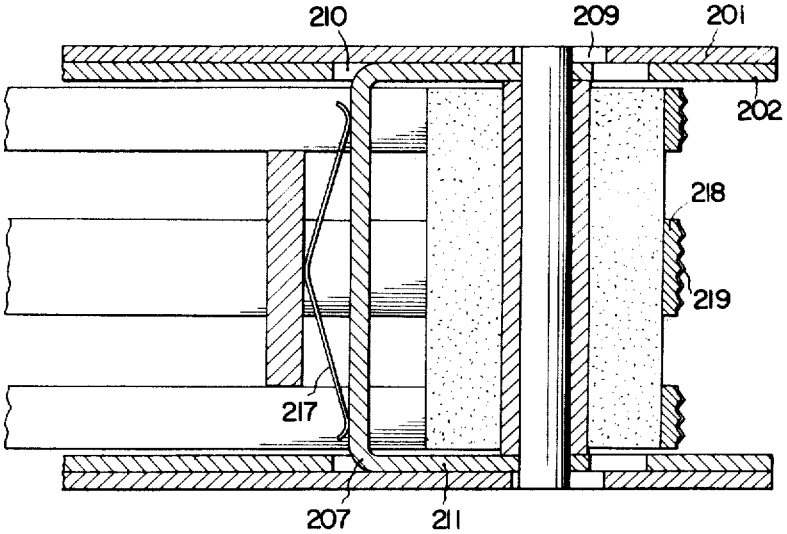
FIG. 12 is a plan veiw of the mechanism shown in FIG. 11.
Figure 13:
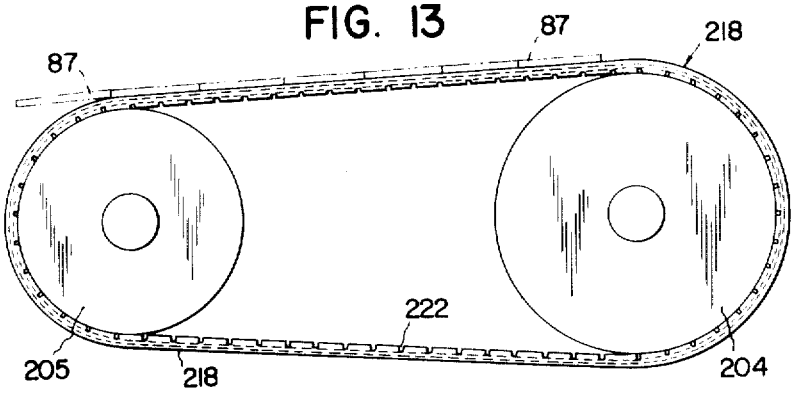
FIG. 13 is a side elevational view, in vertical section, showing a conveyer belt in the mechanism shown in FIGS. 11 and 12.
Figure 14:
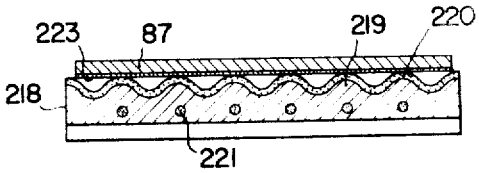
FIG. 14 is an enlarged cross section of the belt shown in FIG. 13.
Figure 18:
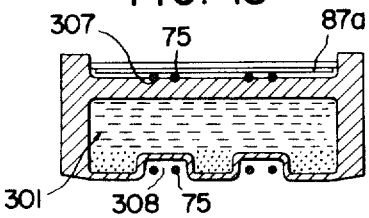
FIG. 18 is a cross section taken along the plane indicated by line XVIII—XVIII in FIG. 16.
Figure 19:
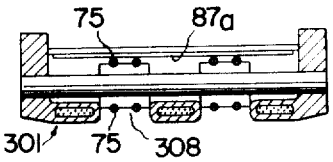
FIG. 19 is a cross section taken along the plane indicated by line XIX—XIX in FIG. 16.

Referring to FIG. 11, the mechanism shown therein has a stationary frame with left and right side plates 203, 203 each made up of an outer side plate 201 and an inner side plate 202 in a tight laminar disposition. Large and small conveyer rollers 204 and 205 are rotatably disposed between the side plates 203, 203 respectively near the rear and front ends thereof. A label receiving base 206 is disposed between these rollers and the side plates and secured by screws to the side plates. Alternatively, the small roller 205 may be adapted to pass through the base 206.

The large roller 204 is rotatably supported on a transverse shaft 208 supported in turn by a U-shaped frame 207, the ends of the shaft 208 being passed outward through slots 209, 209 formed in the two outer side plates. The side flange arms 211, 211 of the frame 207 are fitted in slots 210, 210 in the inner side plates 202, 202.

Each slot 209 in the outer side plate is aligned in a direction substantially parallel to the upper span of the belts and has a width approximately equal to the diameter of the roller shaft 208. Each slot 210 in the inner side plate is substantially parallel to the slot 209 and has a width approximate equal to the width of the arm 211 of the frame. These slots 209 and 210 on each side are overlappingly disposed, and the roller shaft 208 and roller frame arm 211 respectively fitted therein are free to move in the longitudinal direction of the slots.

The upper part of the label receiving base 206 slopes downward toward the front (toward the small roller 205) and has a label tape receiving surface 213 formed by several knife-edge ridges disposed parallelly in the longitudinal direction and has, moreover, belt grooves 214 for receiving belts 218. The label receiving surface 213 has at its front end 215 a steep downward slope which projects forward. At the middle part of this surface 213, there is formed a transverse groove 216 for label cutting. A compression spring 217 is provided below the upper surface 213 to impart a rearward spring force on the aforementioned roller frame 207.

The belts 218 are passed around the large and small rollers 204 and 205 and loosely fitted in respective belt grooves 214. As mentioned hereinbefore, the outer surface of each belt 218 is formed by several knife-edge ridges 219 and is coated with a substance 220 such as silicone oil to which the adhesive on the lower surface of the label tape does not readily adhere. While each belt surface 219 on the base 206 and the label receiving surface 213 lie in almost the same plane, the belt surface is disposed slightly higher than the label receiving surface.

Each belt 218 is provided in its interior with a plurality of longitudinally buried reinforcement filaments 221 and along its inner surface with equal spacing a plurality of transverse grooves 222.

The label tape advancing device of the above described organization is installed in the lower front part of a labeler as illustrated in FIG. 2 and operates in the following manner.

Similarly as in the operation of the preceding first example, the label tape 87 is caused by the manipulation of grip lever 25 to ride on belts 218 and be fed as it slides over the label receiving base 206. At a point above the small roller 205, label tape 87 separates away from belts 218 and, passing by the projecting part 215, arrives at a position below the pressing fingers at the lower front part of the labeler.

During this label advance, the lower adhesive surface of label tape 87 slides in contact with the surface of base 206, but since this surface is in the form of several knife-edge ridges, the contact area is small, whereby there is little possibility of damage to the adhesive surface due to friction and of contamination. Furthermore, since the belt surfaces are also in the form of several knife-edge ridges and, moreover, are coated with a substance such as silicone oil, the labels can be readily separated, and their contamination is prevented.

Another advantageous feature of the above described example of the invention is that, since the belts 218 are constantly under tension due to the spring 217, the label advancing operation is not adversely affected even when the belts become permanently stretched because of the frequency of use or deterioration with the passage of years. Furthermore, since the flange arms 211 of the roller frame 207 are fitted within the slots 210 provided in the inner side plates 202 and can move only in the longitudinal direction of these slots, there is no uncontrolled movement of the roller such as bouncing or chattering, and the belts are moved smoothly.

In a third example of embodiment of the invention as illustrated in FIGS. 15 through 21, a wetting device is provided in the vicinity of the front end of the tape dispensing mechanism whereby an inexpensive label tape without a protective tape can be used.

As illustrated by enlarged views in FIGS. 16 through 19, a water reservoir 301 is disposed within the space between the large and small belt rollers and the upper and lower spans of the belts of a label tape advancing device similar to those of the preceding first and second examples of the invention. The water reservoir may be constructed integrally with the advancing roller frame or may be constructed as a separate structure and fitted into and assembled in the roller frame.

The water reservoir 301 is provided at the front upper part of its forward end with openings 302 and at its bottom with a filling port 303 closeable by screw plug 309, and its interior is filled with a liquid occluding material 304 such as a fibrous material or sponge-like material containing water or a solution occluded therein. In addition, a fibrous material 305 for conducting the liquid from the interior of the reservoir to the openings 302 is laid along the bottom of the reservoir in contiguous contact with the occluding material 304.

Figure 20:
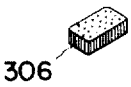
FIGS. 20 and 21 are enlarged perspective views showing examples of moisture applying elements suitable for use in the labeler shown in FIGS. 16 through 19.
Figure 21:
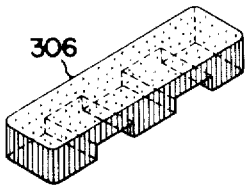

Absorbent moisture applying members 306 which are replaceable are inserted into the openings 302 to contact the fibrous material 305 and thereby to function as wicks, the outer ends of these members 306 being positioned to protrude somewhat from the extreme outer lips of the openings 302. As indicated in FIGS. 20 and 21, these moisture applying members 306 may be respectively single, independent members or may be an integral combination of a plurality of members.

Grooves 307 and 308 for receiving endless conveyer belts 75 for advancing the label tape are formed in the upper and lower parts of the water reservoir 301, the conveyer belts 75 being similar in construction, installation, and operation to those of the preceding first example.

While the label tape 87a in this example is provided with groups of cuts at constant intervals to be engaged by an advancing pawl similarly as in the preceding examples, it is not provided with a protective tape such as tape 11 in the preceding examples. The adhesive on one surface of this label tape 87a is normally dry and becomes adhesive only when it is wetted.

A labeler loaded with this label tape 87a and having the above described organization in accordance with the invention operates in the following manner. The operation caused by manipulation of grip lever 25 to actuate the advancing pawl 65 in reciprocating motion, thereby advancing the label tape 87a intermittently, and to cut and print labels is the same as described hereinbefore with respect to the preceding examples.

Each label thus cut and printed is moved past reservoir openings 302, where it is wet on its lower surface by moisture applying members 306 to become adhesive and is then dispensed and applied onto an article.

In a fourth example of the invention, which is illustrated in FIGS. 22 through 25, and which is a modification of the preceding third example, water is sprayed by a pump mechanism actuated by the manipulation of the grip lever 25 against the adhesive coated surface of each label to wet the same.

Referring to FIGS. 22, 23, 24 and 25, a structure 401 is installed at the bottom of the labeler shown therein below the label tape advancing device and has in its central part a water reservoir chamber 402 bored in the front-rear direction and closed at one end. On left and right sides of this chamber 402, there are provided cylindrical chambers 403 and 404 each closed at one end, which are communicative through check valves 405 and 406 with the water reservoir chamber 402.

Figure 25:
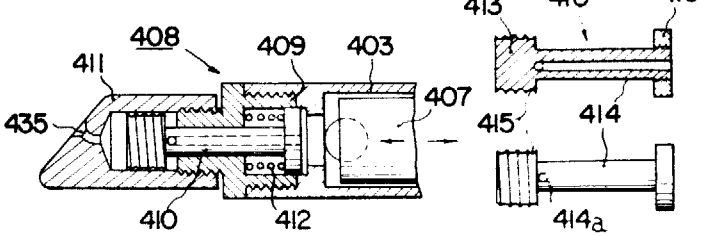
FIG. 25 is an enlarged, fragmentary, left side elevational view showing a nozzle assembly for the labeler illustrated in FIGS. 22 through 24.
Figure 24:
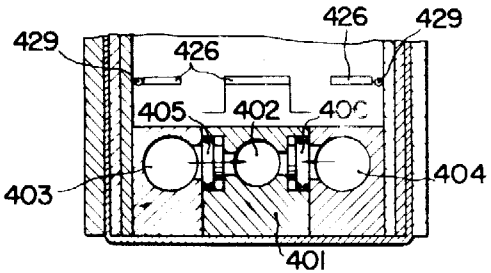
FIG. 24 is a cross section taken along the plane indicated by line XXIV—XXIV in FIG. 22.

The cylinders 403 and 404 are provided with pistons 407, 407 inserted thereinto from the rear ends thereof and with nozzle assemblies 408, 408 screw fitted into the front ends thereof. As shown in FIG. 25, each nozzle assembly 408 comprises a holding structure 409, a core valve 410, a front cap 411, and a spring 412. The core valve 410 has an enlarged diameter part 413 at its front end, a middle tube 414, and a rear flange 416. The enlarged diameter part 413 is provided around its peripheral surface with a helical groove 415. The middle tube 414 is open at its rear end and is provided with a plurality of holes 414a disposed in the vicinity of part 413 and communicating with the hollow interior of the tube 414.

In assembling each nozzle assembly 408, the rear end of the tube 414 of the core valve 410 is inserted (without the flange 416) into the holding structure 409 through the front end thereof. The spring 412 is fitted around the rear end of the tube 414 within the rear end of the structure 409, and then the flange 416 to function as a piston is secured to the rear end of the tube 414 by screw thread attachment or by press fitting. The cap 411 is then screwed onto the holding structure 409. Finally, the rear end of the holding structure 409 is screwed into the end of the corresponding cylinder 403, 404.

The rear end of each piston 407 is coupled by way of a link 417 to the distal end of an arm 419 forming an integral part of the yoke 29. The rear end of the water reservoir chamber 402 is connected through a pipe 423 to a water tank 422 installed within the handle 7. An air valve 424 for adjusting the liquid flowrate is provided in the bottom part of the structure 401.

The label tape is advanced and dispensed by three endless rubber belts 426 traveling in the central part of the label path and endless spring belts 429 traveling on the left and right sides of the outer rubber belts 426. The rubber belts 426 are stretched around a large rear roller 427 and a small front roller 428, which is so disposed that the forward end of the belt 426 is above the nozzle caps 411. The spring belts 429 are stretched around the rollers 427, 428 and a roller 430 and extend to a point in front of and below the front end of the nozzle caps 411, the parts of the spring belts thus extended facing the front ends of the nozzles.

The labeler of the above described organization operates in the following manner. When grip lever 25 is squeezed, pistons 407 are pulled rearward by arm 419 of yoke 29, whereby the water within water storage chamber 402 is drawn through check valves 405 and 406 into cylinders 403 and 404, and, at the same time, the chamber 402 is replenished with water from a tank 422 through a pipe 423.

When the grip lever 25 is released, each piston 407 is caused to advance forward to force the water in the corresponding cylinder (403 or 404) toward flange 416 of nozzle core valve 410 and thereby to force the core valve 410 forward, overcoming the force of spring 412, whereby holes 414a are exposed beyond the end face of holding structure 409. The water under pressure is ejected out through these holes, passes through helical groove 415, and is sprayed out through an orifice 435 in the nozzle cap 411 as it undergoes whirling motion.

Since there are no rubber belts, and only the spring belts 429 are present in the region in front of the nozzles, the spray thus ejected impinges directly on the adhesive bearing surface of the label passing thereby, which surface is thereby wetted and becomes adhesive.

Figure 27:
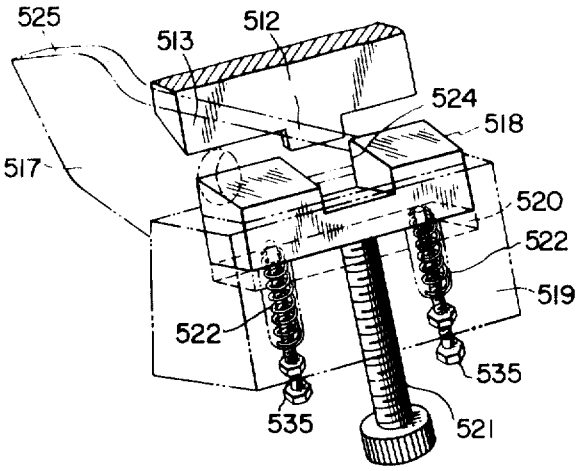
FIG. 27 is an enlarged perspective view of a label cutting device in the labeler illustrated in FIG. 26.
Figure 30:
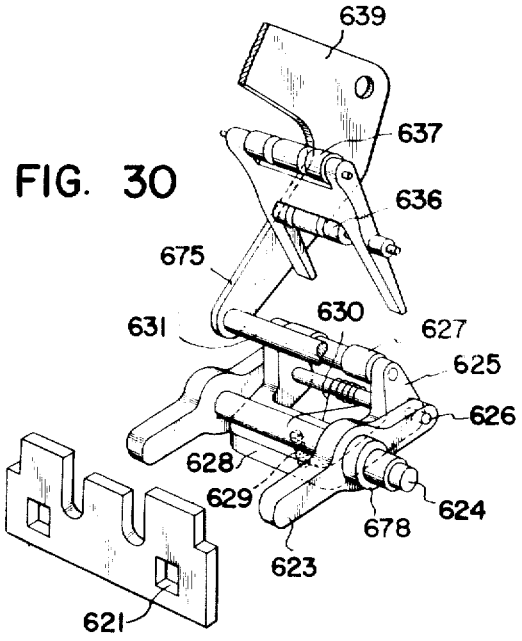
FIG. 30 is an enlarged, exploded perspective view showing an operating mechanism for a label cutter blade back-up plate.
Figure 28:
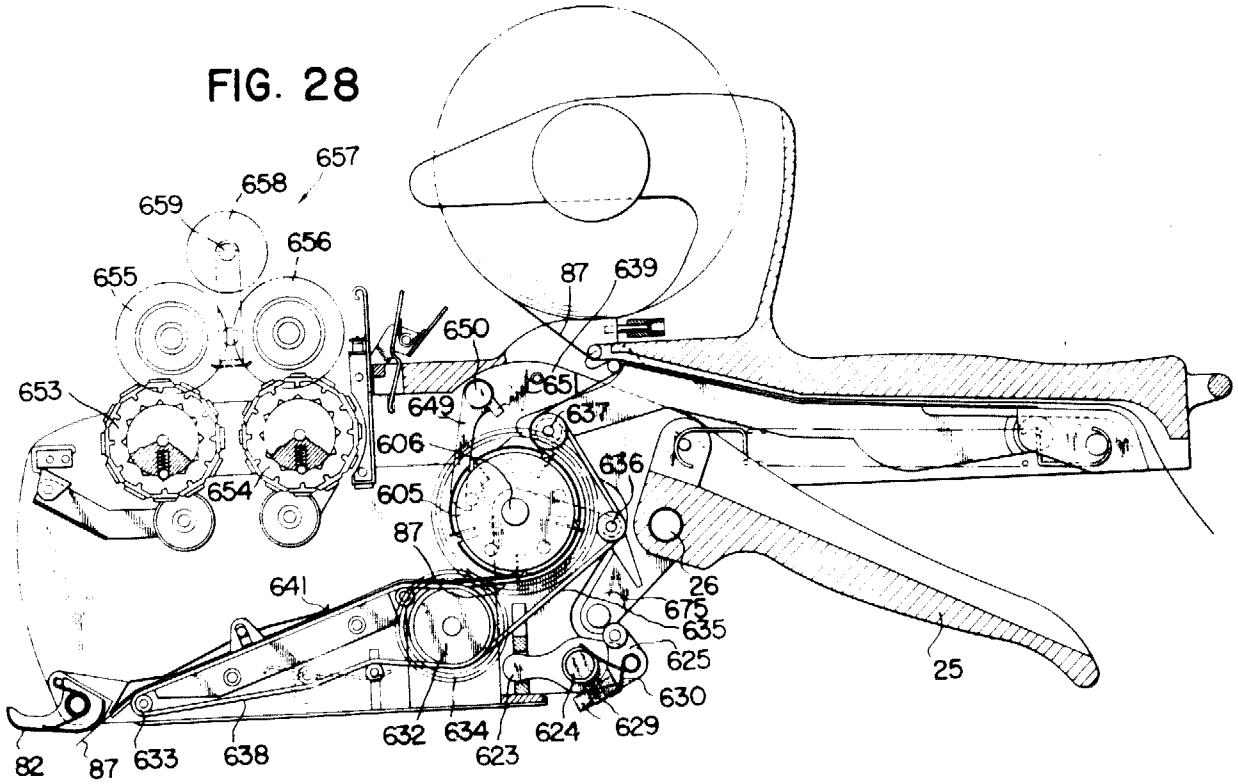
FIG. 28 is a left side elevational view, partly in vertical section, showing a further example of a labeler embodying the invention.

In a fifth example as illustrated in FIGS. 26 and 27 of embodiment of the invention, a label rotating drum is installed at a point in the path of the label tape and provided with teeth which drive the label tape in one direction and with cutters against which a counter cutter block is pressed to accomplish label cutting.

As illustrated in FIG. 26, a grip lever 503 is pivoted by a pin 502 between side plates 501, 501 of the labeler. Between the arms of a yoke 504 constituting the front part of the grip lever 503, there are mounted a drum 505 for advancing and cutting the label tape and printing devices 506 and 507. Label advancing belts 508 are stretched around large and small rollers below the printing devices 506 and 507. A counter cutter block 510 for label cutting is pivoted on the shaft 509 of the large roller.

The cutter block 510 and the drum 505 in combination constitute an important feature of this example of the invention as described below.

As illustrated in FIGS. 26 and 27, the rotating drum 505 is provided on its peripheral surface with a plurality of label tape advancing teeth 512 disposed with constant spacing therearound, each tooth 512 being flanked by contiguously adjoining cutters 513, the cutting edges of which are recessed or retracted relative to the tip of the tooth 512. Each tooth 512 has a width suitable for entry into the central cut 88a (FIG. 10) of the label tape, and the cutters 513 have widths sufficient for cutting the uncut side parts of the tape at a group of transverse cuts. The drum 505 is driven by the returning movement of the released grip lever 503 transmitted through a gear mechanism (not shown), whereby the drum is rotated in the arrow direction shown in FIG. 26.

As shown in FIG. 27, the cutter block 510 comprises, essentially, a counter cutter 518 mounted on an oscillatory arm 517. More specifically, the counter cutter 518 is fitted in a recess formed in a base seat 519 formed at the rear end of the arm 517 and projecting laterally and perpendicularly thereto. The counter cutter 518 is fixed adjustably in the recess by a screw 521 and is adjusted in the following manner.

The grip lever 503 is squeezed, and the counter cutter 518 is pushed upward. The counter cutter 518 is pressed by means of the screw 521 so that it contacts cutters 513 in a position suitable for cutting the label tape 87. The screws 535 in screwed in state below the counter cutter 518 are loosened beforehand. Upon completion of the adjustment of the screw 521, the screws 535 are so adjusted that a slight gap is formed between the heads thereof and the lower surface of the base seat 519.

Coil springs 522 are fitted around the screws 535 below the counter cutter 518. In addition, a tension spring 523 is provided between the base seat 519 and the side plate 501 to apply a downward pulling force to the cutter block 510.

The upper surface of the counter cutter 518 on each side is a flat inclined surface, and at the central part thereof, there is formed a cutout 524 for entrance thereinto of each tape advancing tooth 512. The other (front) end 525 of the arm 517 is curved slightly upward and confronts the lower edge 526 of the yoke 504.

The labeler of the above described organization according to the invention operates in the following manner. When the grip lever 503 is squeezed, the yoke 504 descends, and its lower edge 526 presses front end 525 of arm 517 downward, overcoming the force of spring 523, whereby the counter cutter 518 at the rear end of arm 517 is raised toward drum 505.

One of the teeth 512 then enters cutout 524 of counter cutter 518, and the upper edges of counter cutter 518 approach the cutting edges of cutters 513. Then, when the grip lever 503 is squeezed further, the label tape interposed between cutters 513 and counter cutter 518 is cut. The label thus cut off is advanced, printed, dispensed, and applied by pressing fingers 82 onto an article in the manner described hereinbefore.

Then, when grip lever 503 is released, a cutter block 510 is returned to its original position by a spring 523, and a drum 505 is rotated in the arrow direction shown in FIG. 26 by the return movement of grip lever 503 transmitted through the gear mechanism thereby to advance the label tape by a distance corresponding to the length of one label.

Thus, in the above described example of the labeler according to the invention, the cutter block is pushed upward against the cutters by the squeezing of the grip lever thereby to cut off a label; and, when the grip lever is released, the cutter block is separated from the cutters, and the drum is rotated to cause the teeth thereon to advance label tape by one label length. Accordingly, label tape cutting and advancing are carried out positively and accurately.

The above described fifth example can be modified in the following manner to constitute a sixth example of the invention as illustrated in FIGS. 28 through 37.

Figure 31:
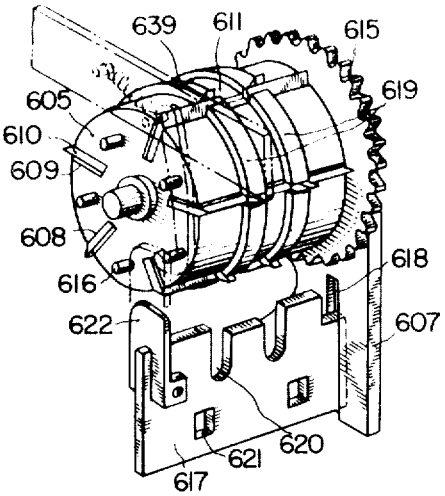
FIG. 31 is an enlarged perspective view showing a label cutter mechanism.
Figure 32:
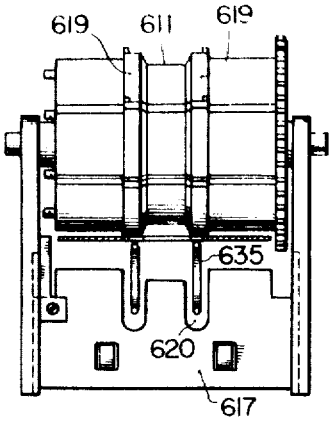
FIG. 32 is a front elevational view of the mechanism shown in FIG. 31.

In this example, there is provided a label tape advancing roller 605 rotatably supported by a shaft 606 between side plates of the labeler frame. This roller 605 is provided on its cylindrical surface near the middle part thereof with two annular ridges 619, as shown in FIGS. 31 and 32, an annular groove 611 being formed therebetween. The roller 605 is further provided in its axial direction with a plurality of cutout slots 608 spaced evenly in the circumferential direction. In each of these slots 608 a label tape advancing tooth plate 609 and a tape cutting blade 610 are inserted and fixed. A gear 615 is fixed coaxially to one lateral face of the roller 605, and a plurality of laterally projecting pins 616 are imbedded at their roots in the opposite lateral face of the roller.

Figure 33:
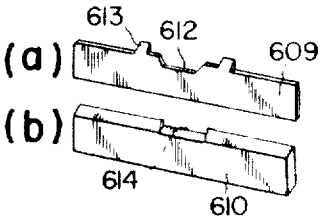
FIGS. 33(a) and 33(b) are prespective views showing a label advancing pawl and a label cutter blade.

Each tooth plate 609 is provided with a cutout part 612 as shown in FIG. 33 for coinciding with a flush relationship with the groove 611 of the roller 605 and with a label tape advancing teeth 613 on respectively opposite sides of the cutout part 612. Each cutting blade 610 is similarly provided with a cutout part 614 in its central part.

A cutting block 617 for operating cooperatively with the roller 605 is disposed therebelow and parallelly thereto, the lateral ends of the cutting block 617 being slidably fitted in and guided by vertical slots 618 formed in support plates 607 secured to the side plates of the labeler frame. Vertical cutout slots 620 are formed on the upper part of the cutting block 617 at positions confronting the aforedescribed ridges 619 on the roller 605, and rectangular through holes 621 are formed therebelow.

An upwardly projecting positioning plate 622 is fixed to the upper part of the block 617 on the side thereof below the pins 616 projecting from the roller 605 and operates, when the block 617 is in its raised position, to enter the space between two adjacent pins 616 to determine the stopping position of the roller 605.

The cutting block 617 is actuated in up and down movement by the front ends of the forwardly projecting arms of rocker levers 623, which front ends are inserted in and engaged with the aforementioned holes 621 in the block 617. The rocker levers 623 are pivoted at their middle parts on a transverse shaft 624 supported on the support plates 607. The other (rear) arms of the levers 623 support a rotatable member 625 having the shape of a double bell-crank and pivoted at its middle part by a pivot shaft 626 on the rear ends of the levers 623.

The rotatable member 625 has two parallel crank arms rotatably supporting a transverse roller 627 and two parallel crank arms which are spanned and integrally connected at their ends by a bridge part 628, which is provided with an adjusting screw 629. This rotatable member 625 is biased in the arrow direction (FIG. 28) by a spring 630 and stopped by the abutting of the tip of the adjusting screw 629 against the side of the shaft 624.

Yoke members 639 of bell-crank shape are fixed to the left and right sides of the proximal part of the hand grip lever 25 and have bent arms 675 extended downwardly and joined at their lower extremities by a transverse pin 631, which is engageable with and disengageable from the aforementioned roller 627. More specifically, when the grip lever 25 is squeezed, yoke members 639 rotate in the counterclockwise direction about the shaft 26, and the pin 631 contacts and pushes a roller 627 to rotate a rotatable member 625 clockwisely through a suitable angle (described hereinafter). Thereafter, the pin 631 rides over and past the roller 627 and is thereby disengaged therefrom.

The above mentioned gear 615 fixed to the left side of roller 605 is in mesh with a gear 634 fixed to the left side of a roller 632 around which a plurality of label advancing endless belts 638 for feeding labels to the dispensing aperture are stretched. Two other endless belts 635 are stretched in a curved configuration around the roller 632 and rollers 636 and 637 disposed around the roller 605, the outer side of the span of these belts 635 between the rollers 637 and 632 being passed in a concave arcuate path around a part of the cylindrical surface of the roller 605. These belts 635 are positioned in the transverse direction to pass through the cutout slots 620 in the cutting block 617.

Figure 34:
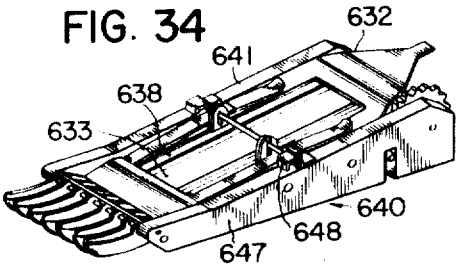
FIG. 34 is a perspective view showing a belt mechanism for advancing labels.
Figure 35:
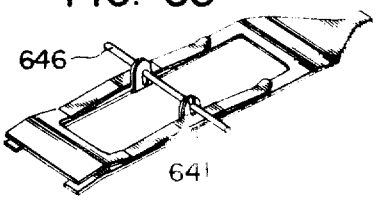
FIG 35 is a perspective view of a spring plate for holding labels.
Figure 36:
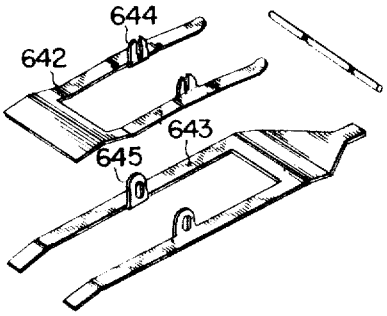
FIG. 36 is an exploded perspective view showing the spring plate shown in FIG. 35 in disassembled state.

The roller 632 is rotatably supported at the upper rear part of a label advancing mechanism 640, as shown in FIG. 34, which is provided near its front end with a small roller 633. The rollers 632 and 633 are the principal rollers around which the belts 638 are stretched. An elastic spring plate 641 is mounted on the part of the mechanism 640. The spring plate 641 consists of two parts 642 and 643 respectively having holes 644 and 645 for receiving an attachment pin 646. The part 62 is superimposed on the part 643, placed in position on the mechanism 640, and fastened by the pin 646 passed through the holes 644 and 645 and fittings 648 at the upper parts of side plates 647 of the mechanism.

The aforesaid tape advancing roller 605 is driven intermittently by a hook lever 649 pivoted at its proximal end on the yoke 639 by a pivot pin 650 and being urged toward the roller 605 by a spring 651. The lever 649 at its distal end has a hook 652 which is engaged with and disengaged from the projecting pins 616 on the right side of the roller 605 by movement caused by the squeezing of the grip lever 25, thereby intermittently rotating the roller 605.

A printing device mounted at the upper front part of the labeler frame is provided with two printing drums 653 and 654 each comprising a plurality of type disks disposed parallelly in side-by-side arrangement. The type disks of the drums 653 and 654 can be rotated independently by respective gears 655 and 656, whereby the numerals, characters, symbols, and other inscriptions to be printed can be changed at will.

Figure 29:
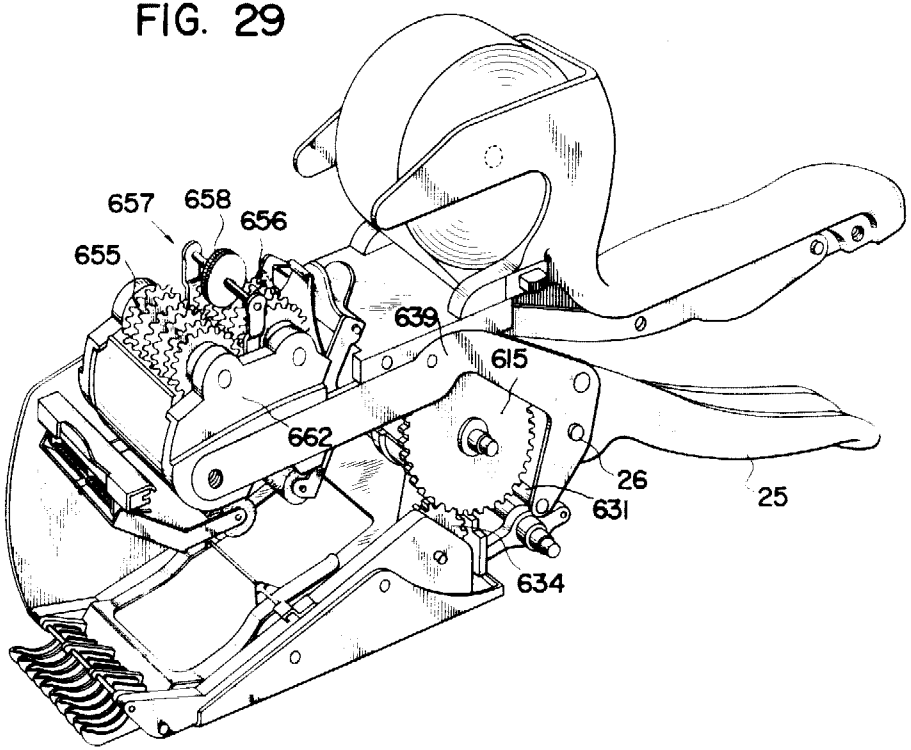
FIG. 29 is a perspective view of the labeler shown in FIG. 28 with its left side plate removed.
Figure 37:
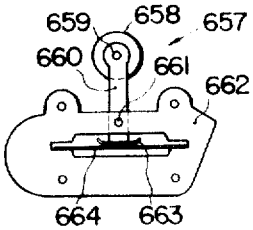
FIG. 37 is a side elevational view of a printing rotating device.

Since the gears 655 and 656 are in mutually close side-by-side disposition as shown in FIG. 29, it is difficult to rotate selected gears by finger-tip manipulation. Therefore, a type rotating device 657 is provided to drive the gears 655 and 656 indirectly. As indicated in FIG. 37, this device 657 comprises a disk 658 having a groove around its periphery in which are provided recessed gear teeth for meshing with any of the gears 655 and 656, a transverse pin 659 rotatably and slidably supporting the disk 658, a tiltable support frame 660 with upright fork members supporting the ends of the pin 659, a pin 661 for pivotally mounting the frame 660 on the upper part of a frame 662 of the printing device, a dish plate 663 fixed to the lower end of the frame 660, and an elastic spring plate contacting the dish plate 663 and stretched across parts of the device frame 662.

The sixth example of the labeler of the above described organization operates in the following manner.

When the hand grip lever 25 is squeezed toward the handle 7, the hook lever 649 descends until the hook at its free end engages the nearest pin 616 of roller 605. Then, when the grip lever 25 is released, the hook lever 649 returns upwardly, causing the roller 605 to rotate in the clockwise direction. Accordingly, a tape advancing 613 enter the cuts provided in the label tape 87 and advance this tape, which is thus advanced as it is held against the roller cylindrical surface by belts 635 until it rides onto advancing belts 638.

At the time when the grip lever 25 is squeezed, downwardly extending arms 675 of yoke members 639 rotate in the counterclockwise direction, whereby pin 631 at their extremities push the roller 627 rearward to cause the rotatable member 625 to rotate in the clockwise direction. Since the adjusting screw 629 of bridge part 628 of this member 625 is abutting against the shaft 624, the front arms of levers 623 rotate in the clockwise direction about the shaft 624 and raise cutting the block 617.

The positioning plate 622 mounted on this cutting block 617 enters the nearest space between adjacent pins 616 of roller 605, and a corresponding cutting blade 610 fixed to the roller 605 is thereby positioned directly above the cutting block 617.

Then, as the cutting block 617 rises further, its upper edge contacts and presses the label tape against cutting the blade 610, thereby cutting off a label. Immediately upon completion of this cutting action, the pin 631 rides over and disengages from the roller 627, and levers 623 consequently are caused by the spring 678 to rotate in the counterclockwise direction, thereby lowering the cutting block 617.

Rotation of the roller 605 is transmitted through the gear 615 fixed thereto and gear 634 meshed with the gear 615 to rotate the roller 632 to which the gear 634 is fixed. Consequently, belts 638 travel and push forward the label cut off from the label tape 87 in the above described manner and now being pressed against belts 638 by the spring plate 641. The label is thus advanced forward and, after being printed by the printing device, is dispensed at a position below the pressing fingers 82 and applied thereby onto an article.

The printing operation is accomplished by the printing mechanism, which is caused to descend by the squeezing of grip lever 25 and thereby to imprint the preset inscription on the label surface exposed in the cutout windows of the spring plate 641.

The printing inscription is set or changed by the sliding disk 658 on pin 659 to the position opposite the gear (655 or 656) for turning the type disk bearing each type to be changed, tilting the frame 660 and disk 658 toward that gear against the resistance of spring plate 664, meshing the disk 658 with that gear, and rotating the disk 658 by finger pressure to rotate the corresponding type disk. When the finger is removed from the disk 658, frame 660 and disk 658 are returned to the central neutral position by the spring plate 664. This process is repeated for each of the other printing types to be changed.

If, when the cutting block 617 is raised against a cutting blade 610 to cut off a label, this cutting block is raised excessively, the cutting edge of the cutting blade will be damaged. On the other hand, if the block 617 is not raised sufficiently, the label will not be fully cut off. Accordingly the stroke of the cutting block is adjusted by means of the adjusting screw 629 on the rotatable member 625.

More specifically, when the projecting length of the tip of the adjusting screw 629 is varied by turning this screw, the rotational angle of the rotatable member 625 when this tip of the screw abuts against the shaft 624 is varied. Accordingly, the operational angular range within which the pin 631 and roller 627 are in engagement when the grip lever 25 is squeezed is thereby varied. As a result, the range of angular movement of the front arms of levers 623 is varied, and the range of vertical rise of the cutting block 617 engaged therewith is thereby adjustably varied.

Thus, a feature of the example labeler as described above is that the rising height of the cutting block can be so adjusted to a value just sufficient for completing the cutting off of a label, after which the block is lowered. Therefore, damage to the cutting edge of the cutting blade is reduced to a minimum. Furthermore, since the label tape and cut off label are pressed against the tape advancing roller by belts, the advancing of the label tape is positive, and moreover, the ends of the cut off labels are prevented from sagging or curling.

It should be under stood, ot course, that the foregoing disclosure relates to only preferred embodiments of the invention and that they are intended to cover all changes and modifications of the examples of the invention herein chosen for the purposes of the disclosure, which do not constitute departures from the spirit and scope of the invention as set forth in the appended claims.

What we claim and desire to secure by Letters Patent is:

1. An improved portable, one-hand-operable labeling machine, including in combination a machine frame having an integral palm-grip handle portion and a dispensing opening, a grip lever operated by manual squeezing thereof toward said handle portion and having a return spring, a roll holder disposed on the frame for rotatably holding a roll of label tape coated on one surface with an adhesive material and having groups of partial cuts therein aligned in the tape transverse direction, said groups being spaced at equal intervals in the tape longitudinal direction, tape advancing means driven by movements of said grip lever to engage at least one of said cuts in successive groups thereof and to advance and guide the label tape with indexed movement along a path toward said dispensing opening of the machine frame, a tape cutting device driven by movements of the grip lever and thereby operating in coordination with said indexed movement to cut the label tape at uncut connective parts thereof at each group of cuts thereby to sever the tape into individual labels, a printing device driven by movements of the grip lever and thereby operating in coordination with said indexed movement to imprint inscriptions to appear on said labels, said printing device having changeable printing types, a tape applying device disposed in the vicinity of said dispensing opening and operating to press each label onto an article to cause said adhesive material to stick the label to the article; and, including the impovement in which the tape advancing means comprises a tape advancing roller having a cylindrical surface and having pawl teeth projecting from said surface and spaced at constant circumferential intervals equal to the spacing intervals of the groups of cuts in the label tape and engaging the cuts of said group, means linking said grip lever to said roller to rotate said roller *intermittently* [intermitently] in one direction upon movement of said grip lever to cause the label tape to advance, and in which the tape cutting device comprises a plurality of projecting cutter blades fixed to the cylindrical surface of the tape advancing roller in transverse alignment respectively with said pawl teeth, a counter cutting block movably mounted within said frame, and means driven by movement of the grip lever due to squeezing thereof to move said cutting block from an original position to press the label tape against one of said cutter blades thereby to sever the label, and driven by movement of the grip lever due to releasing thereof to return said cutting block to said original position.

2. An improved portable, one-hand-operable labeling machine, including in combination a machine frame having an integral palm-grip handle portion and a dispensing opening, a grip lever operated by manual squeezing thereof toward said handle portion and having a return spring, a roll holder disposed on the frame for rotatably holding a roll of label tape coated on one surface with an adhesive material and having groups of partial cuts therein aligned in the tape transverse direction, said groups being spaced at equal intervals in the tape longitudinal direction, tape advancing means driven by movements of said grip lever to engage at least one of said cuts in successive groups thereof and to advance and guide the label tape with indexed movement along a path toward said dispensing opening of the machine frame, a [tap] *tape* cutting device driven by movements of the grip lever and thereby operating in coordination with said indexed movement to cut the label tape at uncut connective parts thereof at each group of cuts thereby to sever the tape into individual labels, a printing device driven by movements of the grip lever and thereby operating in coordination with said indexed movement to imprint inscriptions to appear on said labels, said printing device having changeable printing types, a tape applying device disposed in the vicinity of said dispensing opening and operating to press each label onto an article to cause said adhesive material to stick the label to the article; and, including the improvement in which the tape advancing means comprises a tape advancing roller having a cylindrical surface and having pawl teeth projecting from said surface and spaced at constant circumferential intervals equal to the spacing intervals of the groups of cuts in the label tape and engaging the cuts of said group, means linking said grip lever to said roller to rotate said roller intermittently in one direction upon movement of said griup lever to cause the label tape to advance, and in which the tape cutting device comprises a plurality of projecting cutter blades fixed to the cylindrical surface of the tape advancing roller in transverse alignment respectively with said pawl teeth, a counter cutting block [slideable] *slideably* supported within said frame for vertical movement below said roller, first endless belt means mounted within said frame to press the label tape firmly against the cylindrical surface of the roller, means connected to said grip lever for driving said cutting block upward upon movement of the grip lever to press the label tape against one of said cutter blades thereby to sever a label, and second belt means mounted within said frame adjacent said tape applying device, said second belt means comprising a surface upon which said label is moved toward the dispensing opening and then to the tape applying device.

3. An improved portable, one-hand-operable labeling machine, including in combination a machine frame having an integral palm-grip handle portion and a dispensing opening, a grip lever operated by manual squeezing thereof toward said handle portion and having return spring, a roll holder disposed on the frame for rotatably holding a roll of label tape coated on one surface with an adhesive material and having groups of partial cuts therein aligned in the tape transverse direction, said groups being spaced at equal intervals in the tape longitudinal direction, tape advancing means driven by movements of said grip lever to engage at least one of said cuts in successive groups thereof and to advance and guide the label tape with indexed movement along a path toward said dispensing opening of the machine frame, a tape cutting device driven by movements of the grip lever and thereby operating in coordination with said indexed movement to cut the label tape at uncut connective parts thereof at each group of cuts thereby to sever the tape into individual labels, a printing device driven by movements of the grip lever and thereby operating in coordination with said indexed movement to imprint inscriptions to appear on said labels, said printing device having changeable printing types, a tape applying device disposed in the vicinity of said dispensing opening and operating to press each label onto an article to cause said adhesive material to stick the label to the article; and, including the improvement in which the adhesive material on one surface of the label tape acquires adhesivity only in a moist state, and in which a moisture applying device is provided adjacent the tape applying device to apply moisture to said adhesive material on a label about to be applied, said moisture applying device comprising a liquid reservoir chamber connected to said frame, cylindrical chambers mounted within said frame and connected to said reservoir chamber to receive liquid therefrom, pistons moveable in said cylindrical chambers, nozzle assemblies fitted into said cylindrical chambers and positioned to supply liquid on the label, and a link mechanism for coupling said pistons to said grip lever, whereupon squeezing of said grip lever causes movement of said pistons to expel liquid from said nozzle assemblies.

[4. In an improved labeling machine including a machine frame having a grip lever operated by manual squeezing thereof, and a roll holder for receiving a roll of label tape having an adhesive material on one surface which acquires adhesivity only when said material is in a moist state, the improvement comprising a moisture applying device including a liquid reservoir chamber connected to said frame, cylindrical chambers mounted within said frame and connected to said reservoir chamber to receive liquid therefrom, pistons movable in said cylindrical chambers, nozzle assemblies fitted into said cylindrical chambers and positioned to supply liquid on the label, and a link mechanism for coupling said pistons to said grip lever, whereupon squeezing of said grip lever causes movement of said pistons to expel liquid from said nozzle assemblies.]

*5. An improved portable, one-hand operable labelling machine, including in combination a machine frame having an integral palm-grip handle portion and a dispensing opening, a grip lever operated by manual squeezing thereof toward said handle portion and having a return spring, a roll holder disposed on the frame for rotatably holding a roll of label tape coated on one surface with an adhesive material and having groups of partial cuts therein aligned in the tape transverse direction, said groups being spaced at equal intervals in the tape longitudinal direction, tape advancing means driven by movements of said grip lever to engage at least one of said cuts in successive groups thereof and to advance and guide the label tape with indexed movement along a path toward said dispensing opening of the machine frame, a tape cutting device driven by movements of the grip lever and thereby operating in coordination with said indexed movement to cut the label tape at uncut connective parts thereof at each group of cuts thereby to sever the tape into individual labels, a printing device driven by movements of the grip lever and thereby operating in coordination with said indexed movement to imprint inscriptions to appear on said labels, said printing device having changeable printing types, a tape applying device disposed in the vicinity of said dispensing opening and operating to press each label onto an article to cause said adhesive material to stick the label to the article; and, including the improvement in which the tape advancing means comprises a guide plate pivotally connected to said frame, said guide plate having an arcuate slot therein, a transverse pin extending through said guide plate slot and fixedly connected to said grip lever, a link member pivotally connected to said guide plate, and a pawl element pivotally connected to said link member and having a pawl tooth thereon for engaging said tape whereby movement of said grip lever causes said transverse pin to move through said arcuate guide plate slot to rock said guide plate about its pivotal connection to said frame for reciprocating said link member thereby causing said pawl tooth to engage one of said cuts in said tape to advance and guide said tape for indexed movement along a path toward said dispensing opening.*

*6. An improved portable, one-hand operable labelling machine as set forth in claim 5, in which said tape cutting device comprises a transverse cutting blade having first and second lugs extending transversely from opposed sides thereof, a pair of rocker levers disposed in parallel and pivotally connected intermediate their ends to said grip lever, each said rocker lever having a notched portion at one end for respectively receiving said first and second lugs of said cutting blade, and a roller rotatably mounted on the other ends of said rocker levers for engaging said tape at a portion between said roll holder and said pawl tooth, whereby said cutter blade moves reciprocally with movement of said grip lever to sever said tape.*

*7. An improved portable, one-hand operable labelling machine as set forth in claim 5, in which the adhesive material on one surface of the label tape acquires adhesivity only in a moist state, and in which a moisture applying device is provided adjacent the tape applying device to apply moisture to said adhesive material on a label about to be applied, said moisture applying device comprising a liquid reservoir chamber connected to said frame, cylindrical chambers mounted within said frame and connected to said reservoir chamber to receive liquid therefrom, pistons moveable in said cylindrical chambers, nozzle assemblies fitted into said cylindrical chambers and positioned to supply liquid on the label tape, and a link mechanism for coupling said pistons to said grip lever, whereupon squeezing of said grip lever causes movement of said pistons to expel liquid from said nozzle assemblies.*

References Cited

The following references, cited by the Examiner, are of record in the patented file of this patent or the original patent.

UNITED STATES PATENTS

| | | | |
|---|---|---|---|
| 1,834,170 | 12/1931 | Moar | 156—577 |
| 3,186,890 | 6/1965 | Dorn et al. | 156—442 |
| 3,245,860 | 4/1966 | Aurich et al. | 156—489 |
| 3,342,662 | 9/1967 | Grasmann | 156—384 |
| 3,364,095 | 1/1968 | Govatsos | 156—442 |
| 3,440,123 | 4/1969 | Hamisch | 156—384 |

DOUGLAS J. DRUMMOND, Primary Examiner

U.S. Cl. X.R.

156—577, 510